US009494694B1

United States Patent
Dong et al.

(10) Patent No.: US 9,494,694 B1
(45) Date of Patent: Nov. 15, 2016

(54) METHOD AND APPARATUS OF ROAD LOCATION INFERENCE FOR MOVING OBJECT

(71) Applicant: International Business Machines Corporation, Armonk, NY (US)

(72) Inventors: Wei Shan Dong, Beijing (CN); Ning Duan, Beijing (CN); Peng Gao, Beijing (CN); Chun Yang Ma, Beijing (CN); Zhi Hu Wang, Beijing (CN); Xin Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/963,409

(22) Filed: Dec. 9, 2015

(51) Int. Cl.
G01S 19/42 (2010.01)
G01S 19/43 (2010.01)
G01S 19/52 (2010.01)

(52) U.S. Cl.
CPC .............. *G01S 19/426* (2013.01); *G01S 19/43* (2013.01); *G01S 19/52* (2013.01)

(58) Field of Classification Search
CPC ....... G01S 19/42; G01S 19/52; G01S 19/426
USPC .................................................... 342/357.25
See application file for complete search history.

(56) References Cited

U.S. PATENT DOCUMENTS

| 2004/0073364 | A1 | 4/2004 | Jung et al. | |
|---|---|---|---|---|
| 2005/0283312 | A1 | 12/2005 | Taliwal | |
| 2008/0262728 | A1* | 10/2008 | Lokshin | G01C 21/165 701/472 |
| 2008/0284642 | A1* | 11/2008 | Seacat | G01S 19/42 342/357.25 |
| 2009/0138199 | A1 | 5/2009 | Bonanni et al. | |
| 2011/0172915 | A1 | 7/2011 | Fuchs et al. | |
| 2011/0309976 | A1* | 12/2011 | Leclercq | G01S 19/34 342/357.25 |
| 2013/0131980 | A1 | 5/2013 | Ginsberg | |

OTHER PUBLICATIONS

Taylor et al., "GPS Accuracy Estimation Using Map Matching Techniques: Applied to Vehicle Positioning and Odometer Calibration", Computer, Environment and Urban Systems 30 (2006) pp. 757-772.

Jagadeesh, et al., "A Map Matching Method for GPS Based Real-Time Vehicle Location", The Journal of Navigation, 2004, pp. 429-440.

Lee, et al., Design and Implementation of Vehicle Tracking System Using GPS/GSM/GPRS Technology and Smartphone Application, Internet of Things (WF-IoT), Mar. 2014, IEEE World Forum, pp. 1-6.

* cited by examiner

*Primary Examiner* — Harry Liu
(74) *Attorney, Agent, or Firm* — Scully, Scott, MurphY & Presser, PC; Kevin Jordan, Esq.

(57) ABSTRACT

A method and apparatus of location sequence inferences for moving objects traveling along a path. The method and apparatus primarily concerns determining the location of a moving vehicle on a roadway in a roadway network. The inputs to the system include: raw GPS tracking sequence with timestamp, trajectory of the moving object inferred by map matching, accurate speed sequence from a reliable device, e.g. OBD (On-Board Diagnostics is an automotive term referring to a vehicle's self-diagnostic and reporting capability), historical map matching results and historical locations sequence inference results. The output of the system is a sequence of more accurate location (on road segments) sequences than raw GPS locations and map matching results.

15 Claims, 12 Drawing Sheets

METHOD AND APPARATUS OF ROAD LOCATION INFERENCE FOR MOVING OBJECT

BACKGROUND

Aspects of the present invention generally relate to a method, apparatus, and computer program product of path location sequence inferences for moving objects. Specifically, aspects of the invention relate to locating a moving vehicle traveling along a road in a roadway network.

Accurately locating a vehicle on a map is of critical importance to various applications in the field of intelligent transportation systems (ITS). Automatic vehicle location (AVL) systems enable transit fleet operators to save millions of dollars through reduction of fuel wastage and better utilization of resources. Dynamic route guidance is another key component of ITS that helps to minimize traffic congestion and improve overall utilization of the road network by assisting drivers to avoid congested routes and guiding them in an unfamiliar locality. Applications such these are predicated on the ability to locate mobile users on a road network map.

SUMMARY

Aspects of the invention are a method, apparatus and computer readable program of locations sequence inference for moving objects traveling along a path. Embodiments of the invention primarily concern determining the location of a moving vehicle on a roadway network. The inputs to the system include: raw GPS sequence with timestamp, trajectory of the moving object inferred by map matching, accurate speed sequence from a reliable device, e.g. OBD (On-Board Diagnostics is an automotive term referring to a vehicle's self-diagnostic and reporting capability), historical map matching results and historical locations sequence inference results. The output of the system is a sequence of more accurate locations (on road segments) sequence than raw GPS locations and map matching results.

An exemplary apparatus for inferring the location of an object traveling along a path comprises: map-matching module for linking GPS data to paths and providing matched trajectory GPS data; location reliability assessment module for receiving linked GPS data to paths, reliability assessment rules, and context information and providing reliable GPS data points of the location of the object along the trajectory of the path; sub-trajectories splitter receiving the reliable GPS data points and splitting the trajectory of the reliable GPS data points into a plurality of shorter sub-trajectories paths having GPS data points; location buffer space builder receiving the reliable GPS data points and adjusting the initial boundary and distribution of the reliable GPS data points based on angular velocity constraints and speed constraints of the path hierarchy, and location inference module for combining the GPS data points of shorter sub-trajectories and location buffer space data points and providing an accurate inferred path location of the object.

An exemplary method of inferring the location of an object traveling along a path comprises: obtaining GPS data of the location of the object; map-matching the GPS data to known path locations for providing matched trajectory GPS data; receiving linked matched trajectory GPS data, reliability assessment rules and context information and providing reliable GPS data points of the location of the object along the trajectory of the path; splitting the object trajectory of the path into a plurality of shorter sub-trajectories along the path having GPS data points; receiving the reliable GPS data points and adjusting the initial boundary and buffer space distribution of the reliable GPS data points based on angular velocity constraints and speed constraints of the path hierarchy, and combining the split trajectories path GPS data points buffer space distribution of the reliable GPS data points to provide an accurate inferred path location of the object.

An exemplary non-transitory computer readable medium having computer readable program for inferring the location of an object traveling along a path, comprises: obtaining GPS data of the location of the object; map-matching the GPS data to known path locations for providing matched trajectory GPS data; receiving linked matched trajectory GPS data, reliability assessment rules and context information and providing reliable GPS data points of the location of the object along the trajectory of the path; splitting the object trajectory of the path into a plurality of shorter sub-trajectories along the path having GPS data points; receiving the reliable GPS data points and adjusting the initial boundary and buffer space distribution of the reliable GPS data points based on angular velocity constraints and speed constraints of the path hierarchy, and combining the split trajectories path GPS data points buffer space distribution of the reliable GPS data points to provide an accurate inferred path location of the object.

The objects, features, and advantages of the present disclosure will become more clearly apparent when the following description is taken in conjunction with the accompanying drawings.

DETAILED DESCRIPTION OF PREFERRED EMBODIMENTS

The Global Positioning System (GPS) is a satellite-based radio navigation system. GPS provides information regarding location of a device. Positional accuracy of the order of 10-20 m is now possible subject to the availability of signals from at least 4 satellites. However, in dense urban environments, high-rise buildings and other tall structures often block the satellites from the direct line-of-sight of the GPS receiver resulting in degradation of accuracy and sometimes, temporary outage of the GPS signal. Nevertheless, the relative improvement in the accuracy of the GPS caused by removal of selective availability and the demand for stand-alone and portable PDAs (personal digital assistant) serve as compelling reasons for attempting to realize a vehicle location method that uses GPS as the sole means of positioning.

With the development of telematics, sensor and mobility technologies, Millions-of-Connected-Vehicles will be the reality in the near future. The advances in location positioning and wireless communication technologies have given rise to the prevalence of mobile computing systems and location-based services (LBS), leading to a myriad of spatial trajectories representing the mobility of a variety of moving vehicles.

However, as the readings of a GPS sensor have positioning errors and sampling errors, the departure of the GPS locations from the actual locations can hardly be avoided. As a result, the task of accurate location inference is very important in providing high-quality LBS in many connected vehicle scenarios.

The positional output of the GPS in terms of latitude and longitude can be converted into X and Y coordinates with respect to a two-dimensional surface. However, for applications that require vehicle location, such a positional output is meaningless unless it can be correlated to a road. Also, the errors inherent in the output of the positioning system can be corrected by considering the fact that the vehicle is mostly constrained to a finite network of roads. For instance, an inaccurate GPS output that implies that the vehicle is in the middle of a building or a lake can immediately be ruled incorrect. Map matching algorithms match the inaccurate raw position provided by the positioning system to a position on the road network by comparing the trajectory of the vehicle with the shapes of the roads in the network.

Map matching is a task of matching original GPS tracking data to a digital map while handling exceptions, correcting errors, reducing noise and redundancy. Map matching links each GPS point to a road segment. The task of map matching is to infer the trajectories for moving objects, but accuracy of the locations on each road segment is not guaranteed.

In locating a moving object on a network of roadways the instantaneous speed (e.g. OBD Speed) of GPS points is an important reference to identify the correct location of moving objects. As a result, instantaneous speed of moving object is usually more reliable due to a gyroscope, etc. The location distribution of a trajectory should be consistent with its instantaneous speed feature but it is difficult to directly calculate location of trajectory only using its instantaneous speed. The location of some GPS points is more reliable than others according to its context information. Location of GPS data points with an object moving at a higher speed is more reliable than the location of an object moving at a lower speed. Data points with high speed should occur along a roadway of a highway, rather than a urban alley/urban path, and vice versa. Through reliability assessment of data points, location inference of a whole trajectory can be translated as follows: an entire long trajectory can be split into multiple sub-trajectories with more reliable data points and location inferences of a series of independent sub-trajectories. Location buffer space of points is a valid measure location inference, which can be built by an initial boundary and distribution, adjustment of angular velocity and road type based speed constraints etc.

A problem encountered in determining the location of moving vehicles is that if there is an error mapping the location to an urban highway, the heading angle will also be incorrectly calculated. The result is wrong behavior identification, e.g., for a sharp turn requiring a turn in a time which is impossible for the vehicle to perform.

An aspect of the invention uses a locations sequence inference based on fully offline information, include: raw GPS sequence with timestamp, trajectory of the moving object inferred by map matching, accurate speed sequence from some reliable device, e.g. OBD, historical map matching results and historical locations sequence inference results. The output is a sequence of more accurate locations (on road segments) sequence than raw. GPS locations with map matching results. Also, embodiments of our invention further find the specific locations on the roadways produced by map-matching methods.

In many vehicle connected scenarios the correct location of moving objects (vehicles) is very important information. The GPS location is always drifting/offset to the real location due to current technical limitations.

The instantaneous speed of GPS points is an important reference to identify the correct location of moving objects. The instantaneous speed of a moving object is usually more reliable due to a gyroscope. The location distribution of a trajectory should be consistent with its instantaneous speed feature. However, it is very difficult to directly calculate location of trajectory only relying on instantaneous speed. Location of some GPS points is more reliable according to its context information. GPS data points with high speed should have more possible locations along a roadway of a highway compared to an urban alley/urban path and vice versa.

Through reliability assessment of data points, location inference of a whole trajectory can be translated as location inferences of a series of independent sub-trajectories which are independent. Location buffer space of a data point is a valid measure to location inference, which is affected by reliability of itself and reliability and buffer space of neighbor points.

The result is a much simplified location inference on a roadway.

There are 4 key factors to support the improvement provided by the embodiments of the invention:
1. GPS data points recorded of vehicles traveling at a higher speed usually have higher accuracy than those recorded of vehicles traveling at a lower speed.
2. GPS error-bound vary geographically due to the quality of GPS signals which are easily affected by many factors in a densely populated area such as a city, e.g.: high buildings, elevated roads, and the like.
3. Moving vehicle motion is constrained in angular velocity.
4. Moving vehicles have speed constraints on different roads (road hierarchy).

As a result of the above key factors, embodiments of the invention provide the following improvements:

1. GPS error bound Constructor. Based on historical locations sequence inference results (or map matching results if not applicable) to construct a GPS error bound for each road segment.
2. Location Reliability Evaluator. Based on GPS error bound, as well as some predefined Reliability Assessment Rules (e.g. factor 1), the method and apparatus embodiments can evaluate the reliability for each GPS point.
3. Sub-Trajectories Splitter. Based on the results from the Location Reliability Evaluator, the apparatus divides long GPS points sequence into many sub-sequences. The boundary points should be as reliable as possible.
4. Location buffer Builder. For each sub-sequence generated by Sub-Trajectories Splitter, the apparatus first generates an initial boundary and distribution of candidate-locations for each GPS point on its corresponding road segment (specified by map matching); and then makes adjustment based on angular velocity constraints; and lastly, makes further adjustment based on speed constraint by road hierarchy.
5. Location Inference. In one embodiment, the apparatus contains 2 modules: a speed sequence consistency evaluator and an optimization solver. The sequence consistency evaluator is responsible for evaluating consistency for a speed sequence based on a given location sequence and speed sequence sampled from devices (e.g. OBD). The optimization solver tries to find the best solution so that each location-candidate stays at as high possibility as possible and the inferred speed sequence is consistent to the sampled speed sequence as possible.

Figure 1:
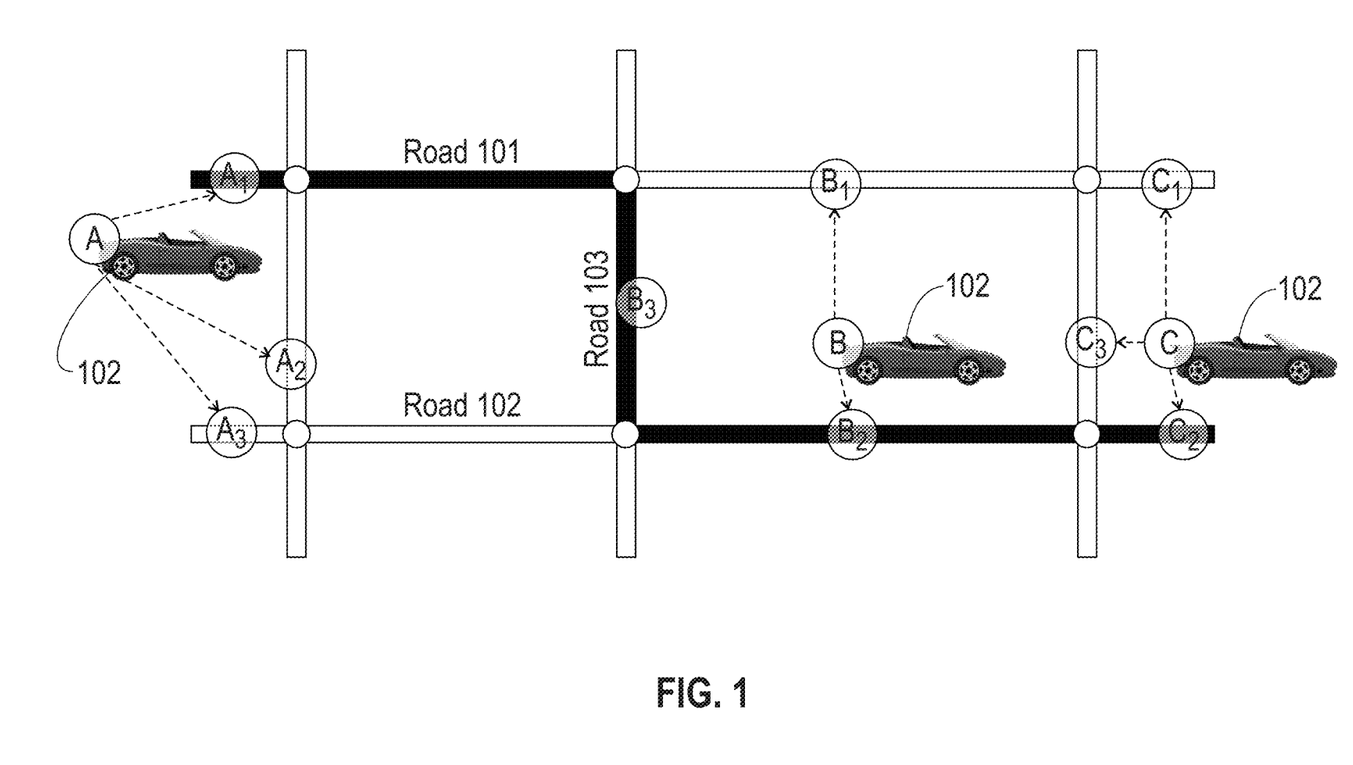
FIG. 1 illustrates map matching with trajectory inference.

FIG. 1 illustrates map matching with trajectory inference. Vehicle 102 initially at GPS location A can be recognized as being along a roadway at position $A_1$, $A_2$, or $A_3$ based on GPS tracking data and map matching. Later the vehicle 102 is at GPS location B and can be recognized at roadway locations $B_1$, $B_2$, or $B_3$ based on GPS and map matching. Finally, the vehicle 102 at GPS location C can be located along roadway at $C_1$, $C_2$, or $C_3$. According to the above results, the vehicle can be travelling along a combination of roadways connecting the data points $A_1$, $A_2$, or $A_3$, with $B_1$, $B_2$, or $B_3$, with $C_1$, $C_2$, or $C_3$. The correct result is not obtainable, but it is one of the combinations of results.

Figure 2:
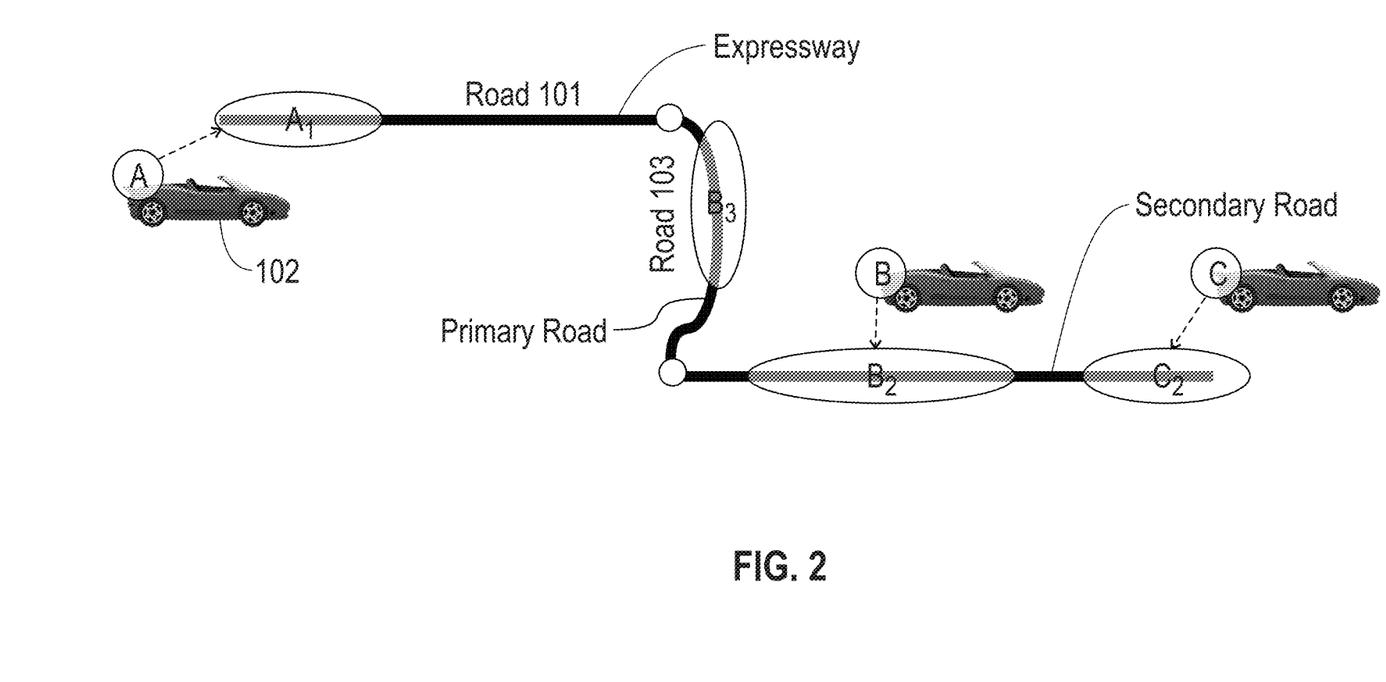
FIG. 2 shows the result of applying the embodiments of the invention to the map-matching in FIG. 1.

Using raw GPS sequence data, i.e., locations with time stamp information, combined with trajectory inferred by map matching using road segments with hierarchy (e.g., expressway, primary road, secondary road and the like), geometry, etc. along with historical map matching results for the road segments, historical location inference results, and OBD speed sequence, i.e., vehicle speed and acceleration with timestamp, a sequence of inferred locations is the output. The result is the single path, namely A1, B3, B2, and C2, shown in FIG. 2.

Figure 3:
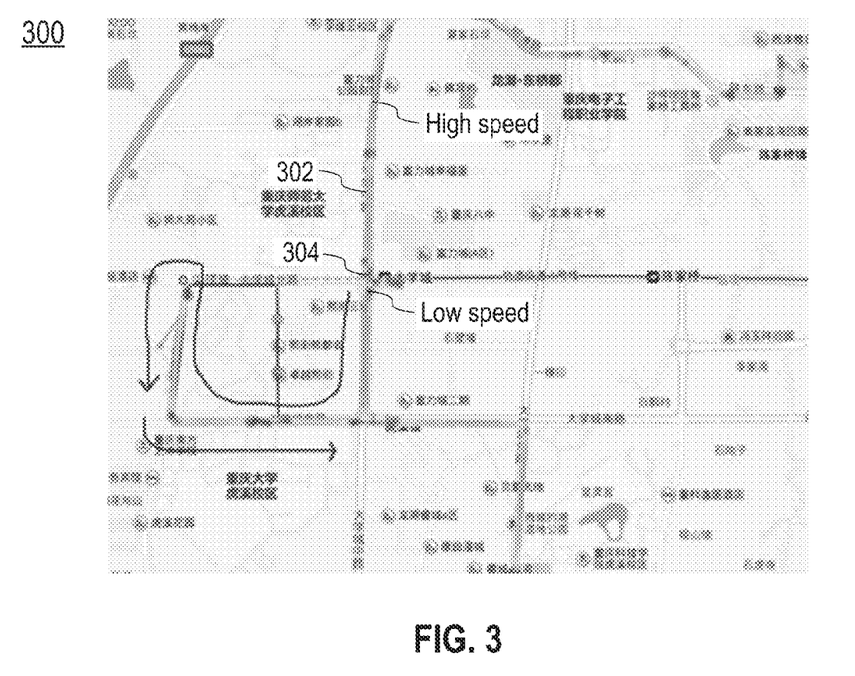
FIG. 3 shows GPS data for a vehicle over a period of time along a portion of a typical road in a road hierarchy where certain roads are high speed roads and other roads are low speed roads.

FIG. 3 is a visualization of all GPS data for one vehicle over 24 hours. The GPS accuracy is higher when the vehicle is traveling at a higher speed, e.g., along a high speed road 302 and is lower when the vehicle is traveling at a slower speed, e.g., along a low speed road 304. This property of the GPS device can serve as an important reliability assessment rule.

Figure 4:
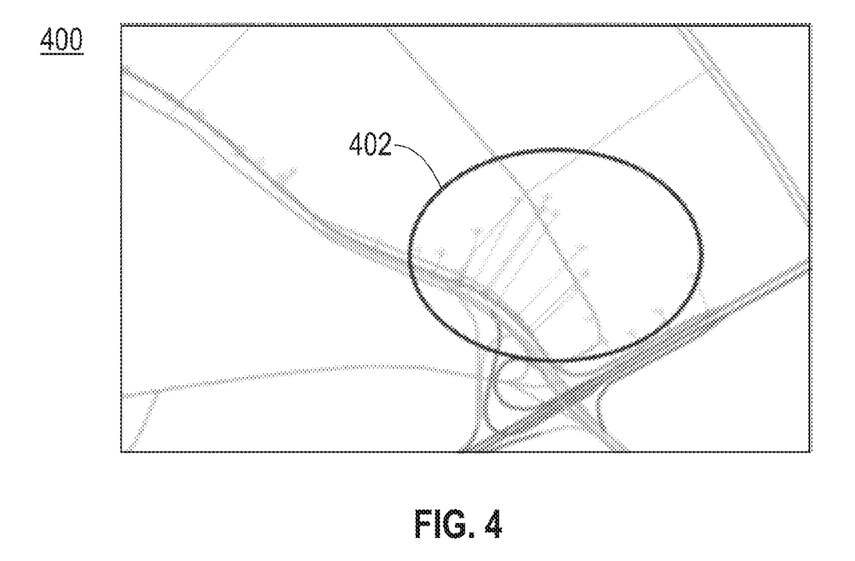
FIG. 4 shows a portion of a map showing an area of GPS floating or uncertainty.

FIG. 4 shows a portion of a map 400 showing an area 402 of GPS floating or uncertainty error. GPS error-bound varies in geospace. At some locations the error-bound is large and at others is small.

Figure 5:
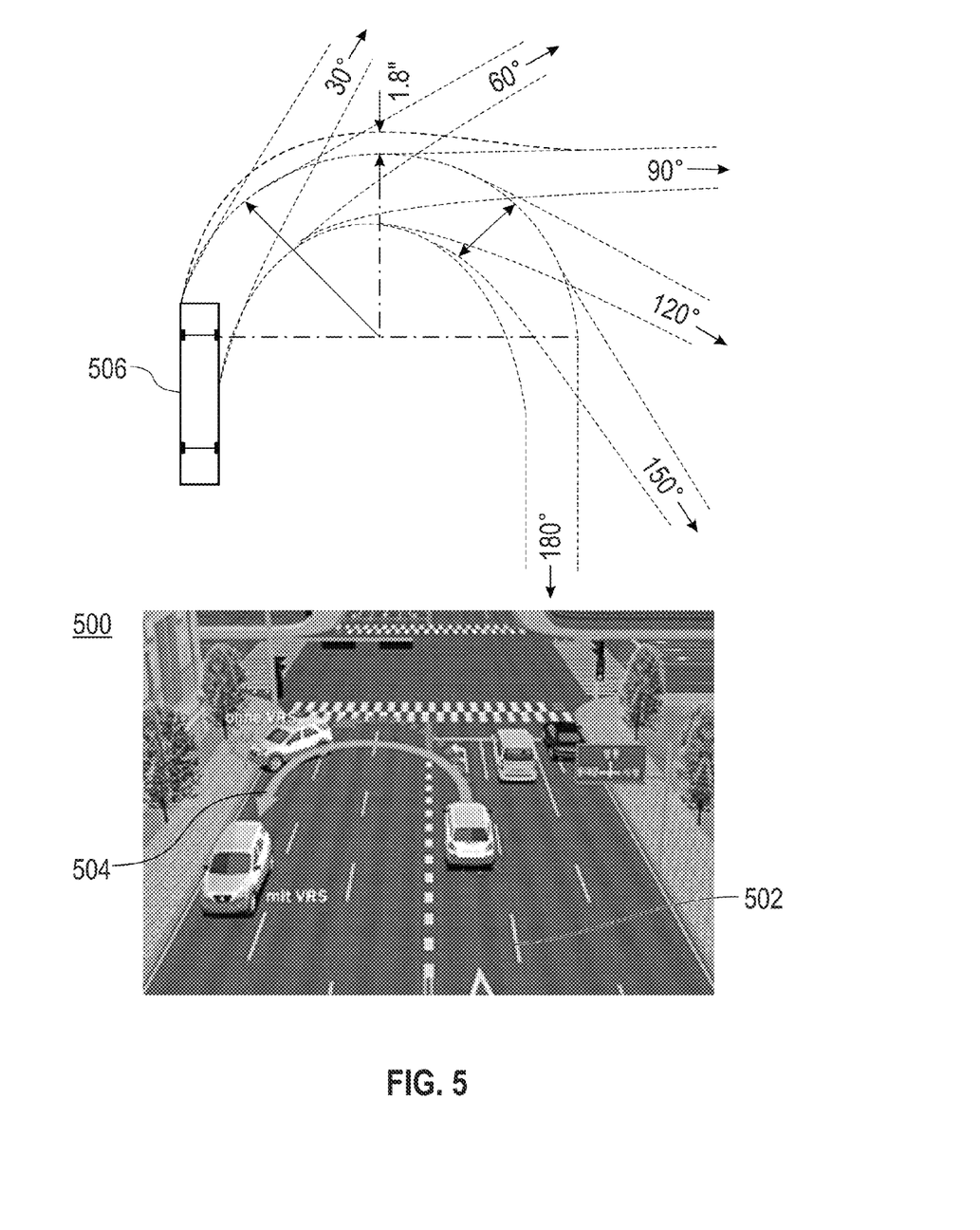
FIG. 5 shows a moving vehicle having angular velocity constraints traveling on a road.

FIG. 5 shows a road 500 where a vehicle 502 wants to make a u-turn as shown by the arrow 504. Above is a schematic drawing of the physics of the u-turn indicating that the vehicle 506 has angular velocity constraints on the movement of the vehicle performing the u-turn maneuver.

Figure 6:
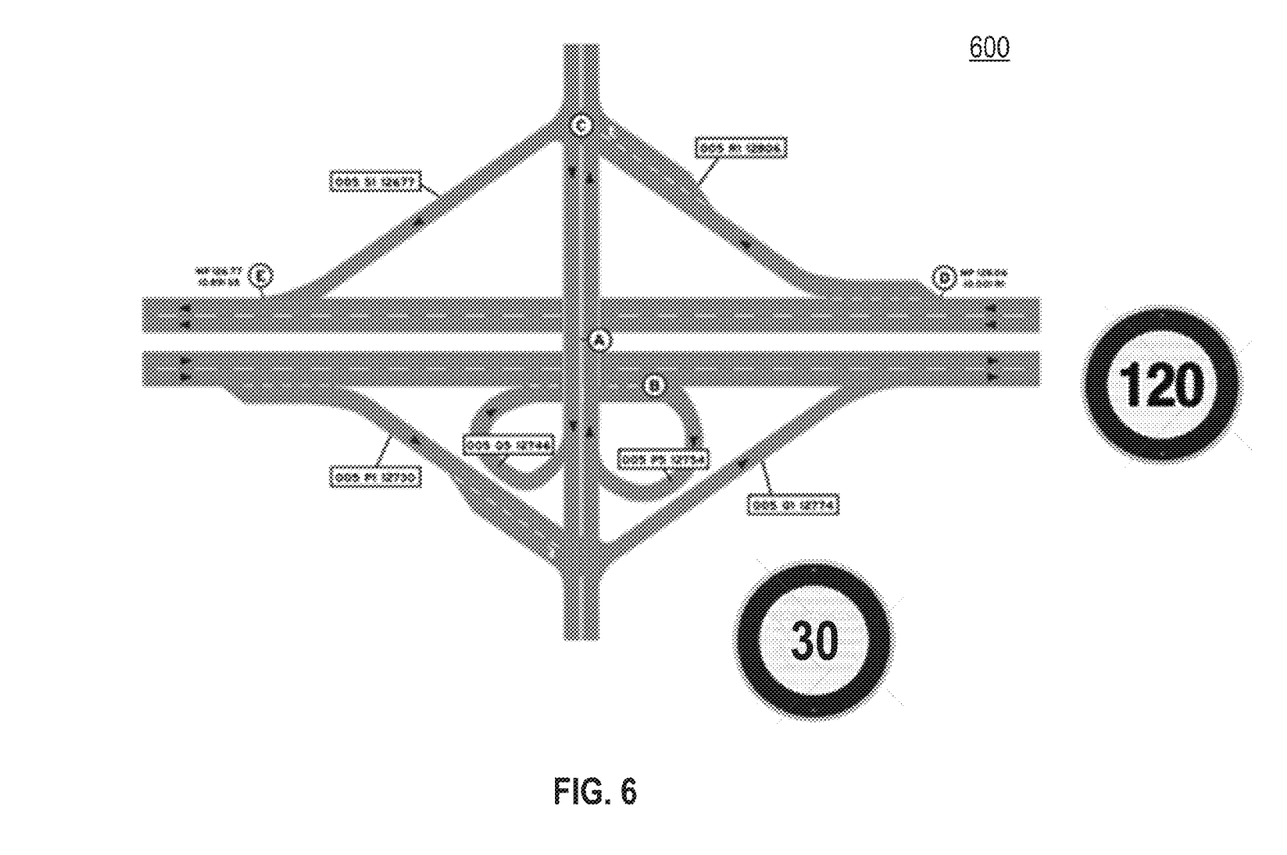
FIG. 6 shows an intersection of roads where different roads have different speed limits, where vehicles traveling through the intersection have speed constraints on different roads (hierarchy).

FIG. 6 shows an intersection of roads 600 where different roads have different speed limits, e.g., 30 kph and 120 kph. Moving vehicles traveling through the intersection have speed constraints on different roads (hierarchy).

Figure 7:
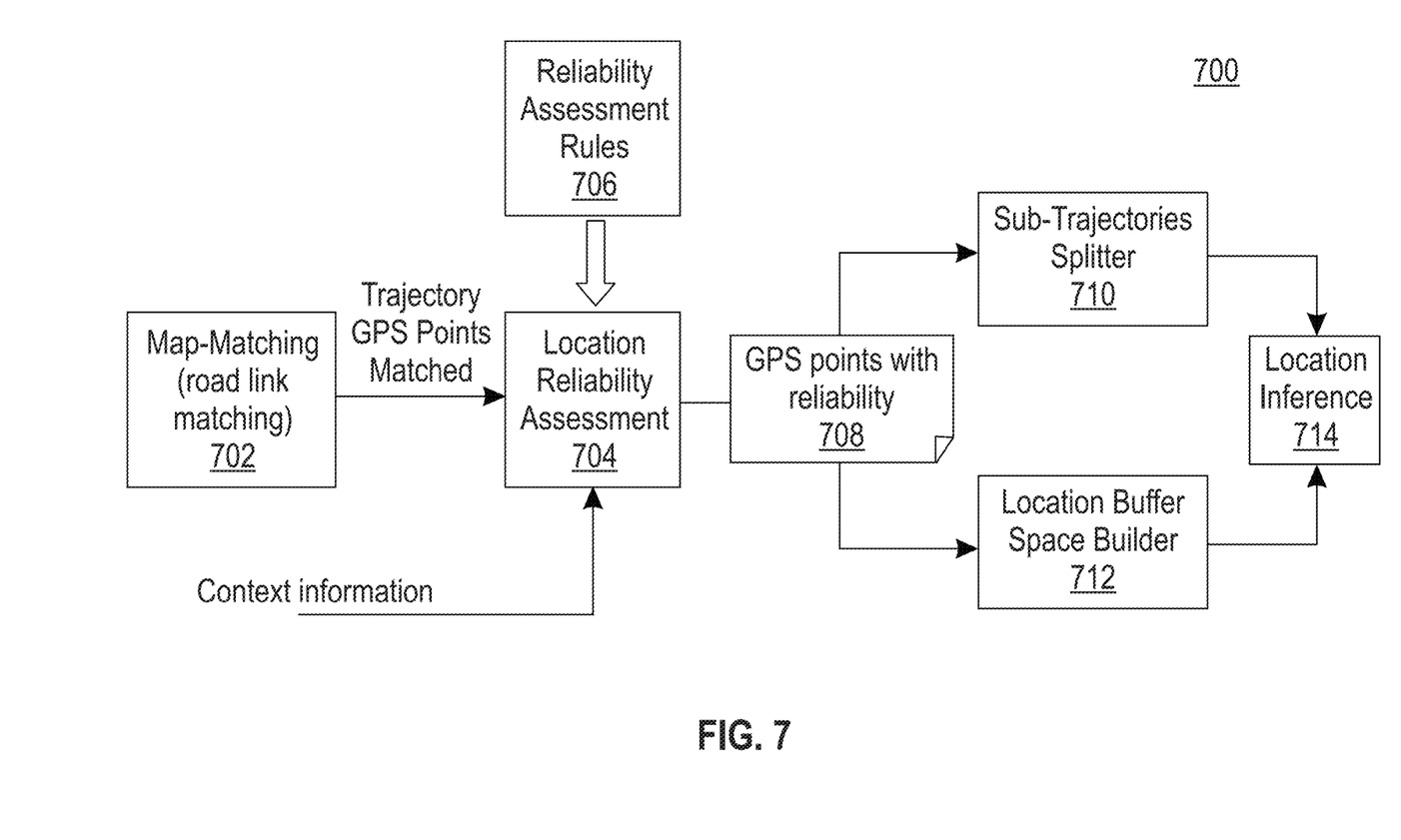
FIG. 7 shows a high level schematic block diagram illustrating an embodiment of the present invention.

FIG. 7 shows a high level schematic block diagram illustrating an embodiment of the present invention. In the system 700, raw GPS data from satellites (not shown) is provided as an input to a map-matching module 702 for linking the GPS data to roads. The output of the map-matching module is matched trajectory GPS points provided to a location reliability assessment module 704. Reliability assessment rules 706 and context information e.g., road network, intersections, road type, and the like are provided as further inputs to location reliability assessment module 704. The output of module 704 is a sequence of reliable GPS points 708. Based on GPS error bounds, as well as some predefined reliability assessment rules, the method and apparatus can evaluate the reliability for each GPS point.

The sequence of reliable GPS points is provided as input to both a sub-trajectories splitter 710 and a location buffer space builder 712. The sub-trajectories splitter 710 receives the original long trajectory path and splits it into a plurality of shorter sub-trajectories paths. The location buffer space builder accounts for adjustments such as initial boundary and distribution of the GPS points, adjustment based on angular velocity constraints, and adjustment based on speed constraints by virtue of the road hierarchy. Based on the results from the location reliability evaluator, the apparatus divides long GPS point sequences into many sub-sequences. The boundary points should be as reliable as possible.

The outputs from the splitter 710 and the buffer space builder 712 are combined in a location inference module 714 to provide an accurate road location inference for a moving object. For each sub-sequence generated by sub-trajectories splitter, the apparatus first generates an initial boundary and distribution of candidate locations for each GPS point on its corresponding road segment (specified by map matching); and then makes adjustment based on angular velocity constraints; and lastly, makes further adjustment based on speed constraint by road hierarchy.

Figure 8:
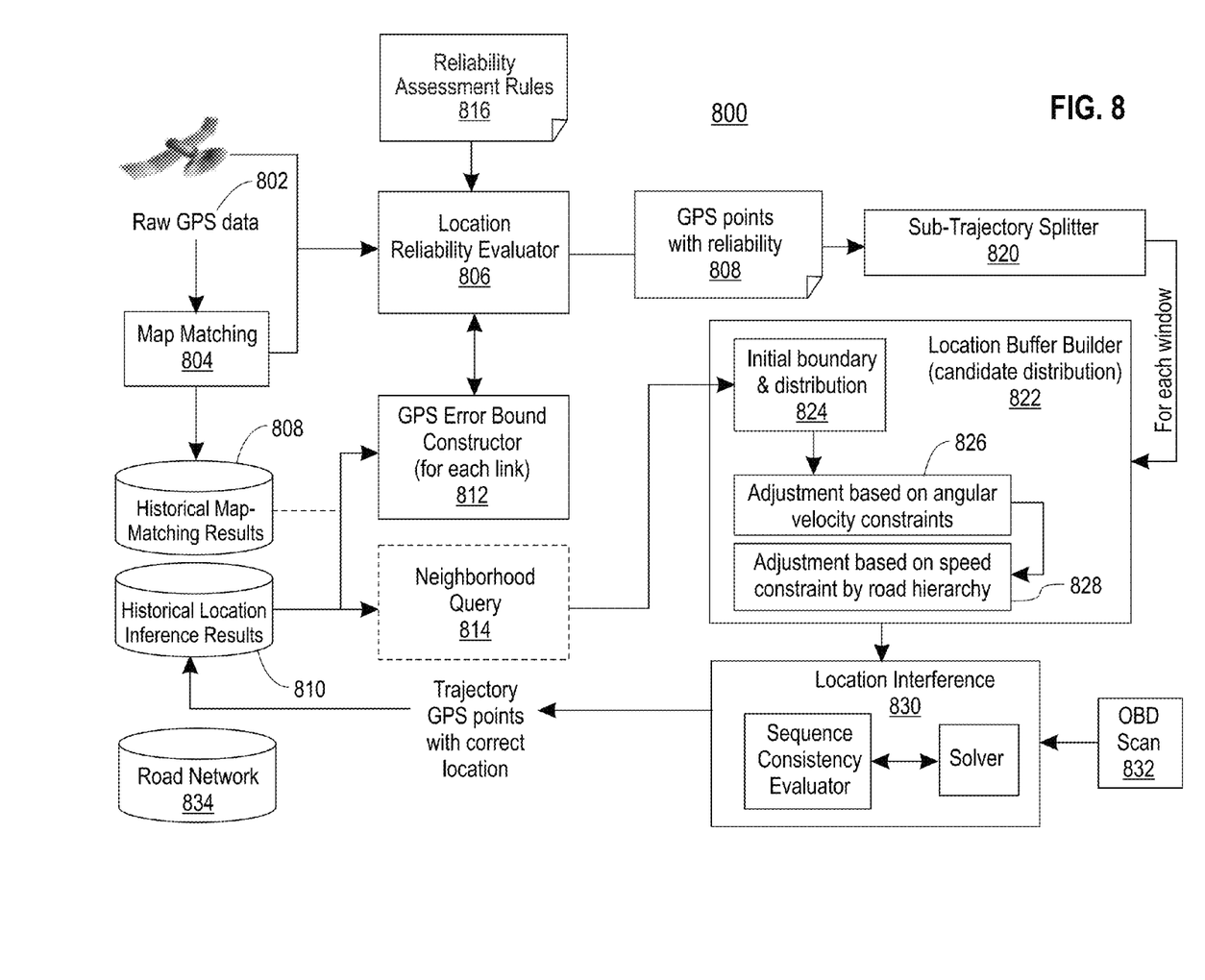
FIG. 8 is a schematic block diagram of a system for performing aspects of the invention in FIG. 7.

FIG. 8 is a schematic block diagram of a system 800 for performing aspects of the invention in FIG. 7.

Raw GPS data of the vehicle location 802 is provided for map matching module 804. The output of the map matching module and the raw GPS data are provided to a Location Reliability Evaluator 806. The output of the map matching module is also provided as an input to a historical map-matching results storage 808. A storage 810 stores historical location inference results. The outputs of the historical map-matching results 808 and historical location inference 810 results are provided to a GPS error bound constructor (for each road) 812. The output of the historical location inference results is provided as an input to a neighborhood query 814.

Reliability assessment rules 816, such as whether the speed is high or low, is input to the location reliability evaluator 806. Data is shared between the location reliability evaluator 806 and the GPS error bound constructor 812.

The output of the location reliability evaluator 806 is a sequence of GPS data points with high reliability 808. The sequence of data points is provided to a sub-trajectories splitter 820 which splits the long roadway trajectories into shorter roadway sub-trajectories.

Figure 9:
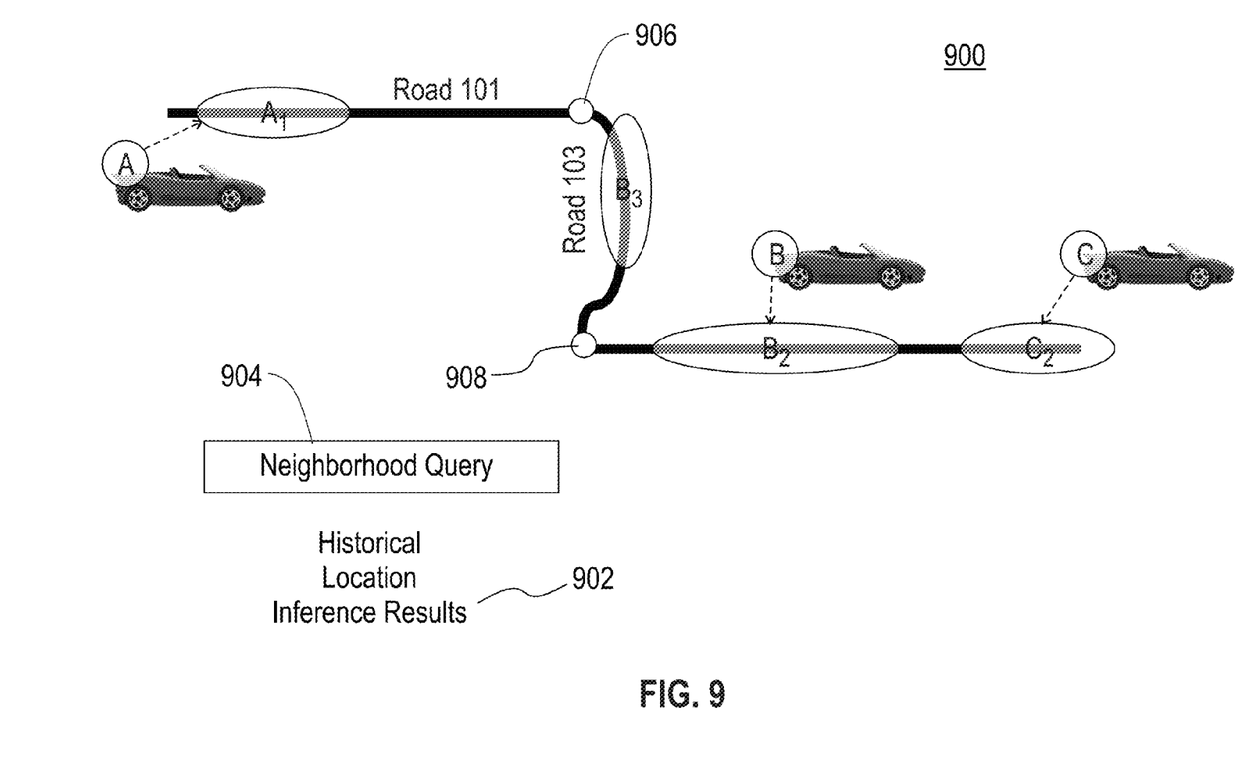
FIG. 9 shows the initial boundary and distribution arrangement of actual vehicle locations based on a neighborhood query of historical locations inference results to set the initial boundary and distribution of the GPS data points.

A location buffer builder (candidates distribution) includes an initial boundary and distribution module 824 which receives as its input the output of the neighborhood query 814. FIG. 9 shows the initial boundary and distribution arrangement 900 which combines historical location inference results 902 and a neighborhood query 904 to set the initial boundary and distribution of the GPS data points, e.g., 906 and 908. A neighborhood query 904 is performed on the database of historical location inference results 902 to build initial boundary and distribution of actual vehicle location probability. That is, the GPS location is just a sampled location for an actual vehicle location. As a result, all possible locations in the initial boundary can have a probability (indicating how likely a location is the real location) i.e., the distribution. The initial boundary and the distribution (probability) can be adjusted based on the angular velocity.

Figure 10:
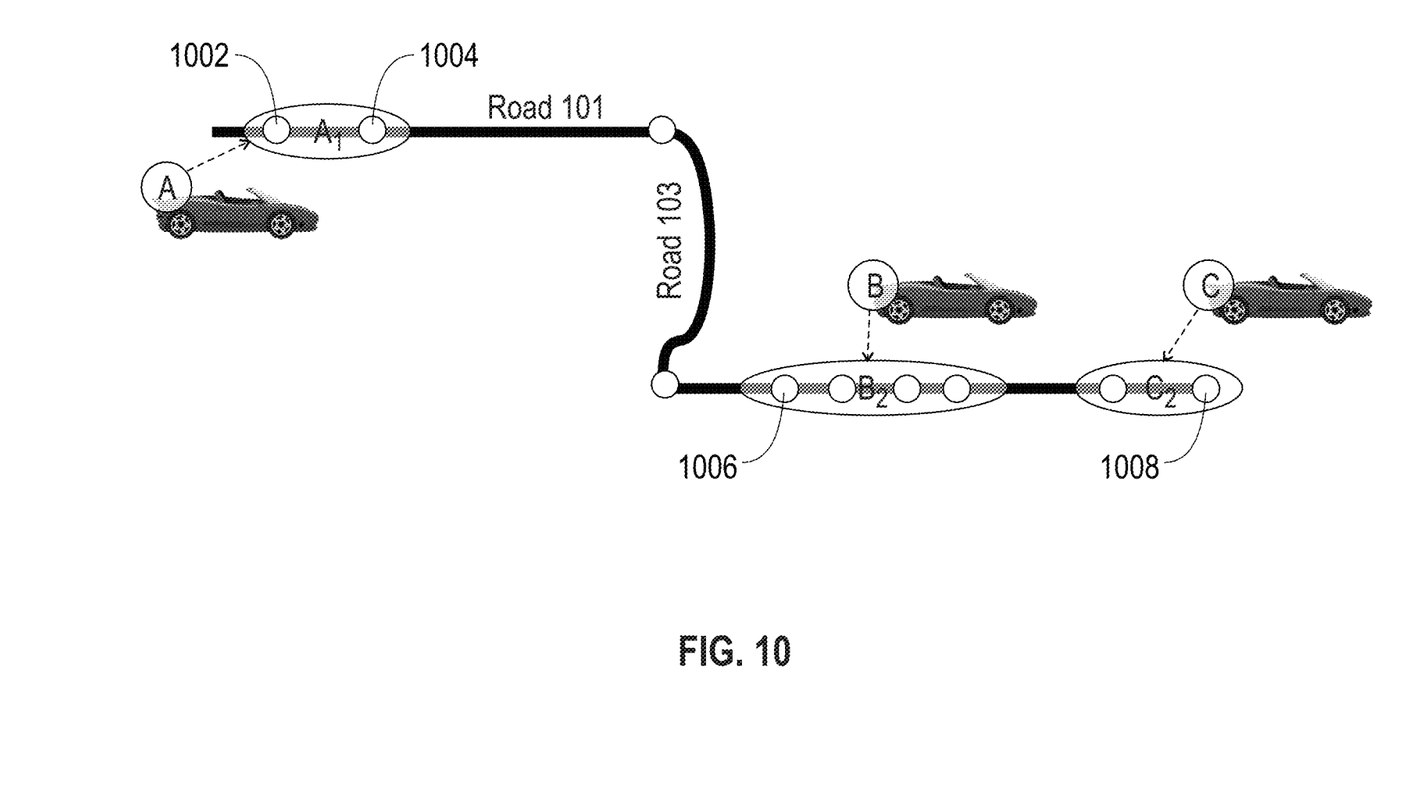
FIG. 10 shows the adjustment of the initial boundary and distribution (probability) based on angular velocity constraints.
Figure 11:
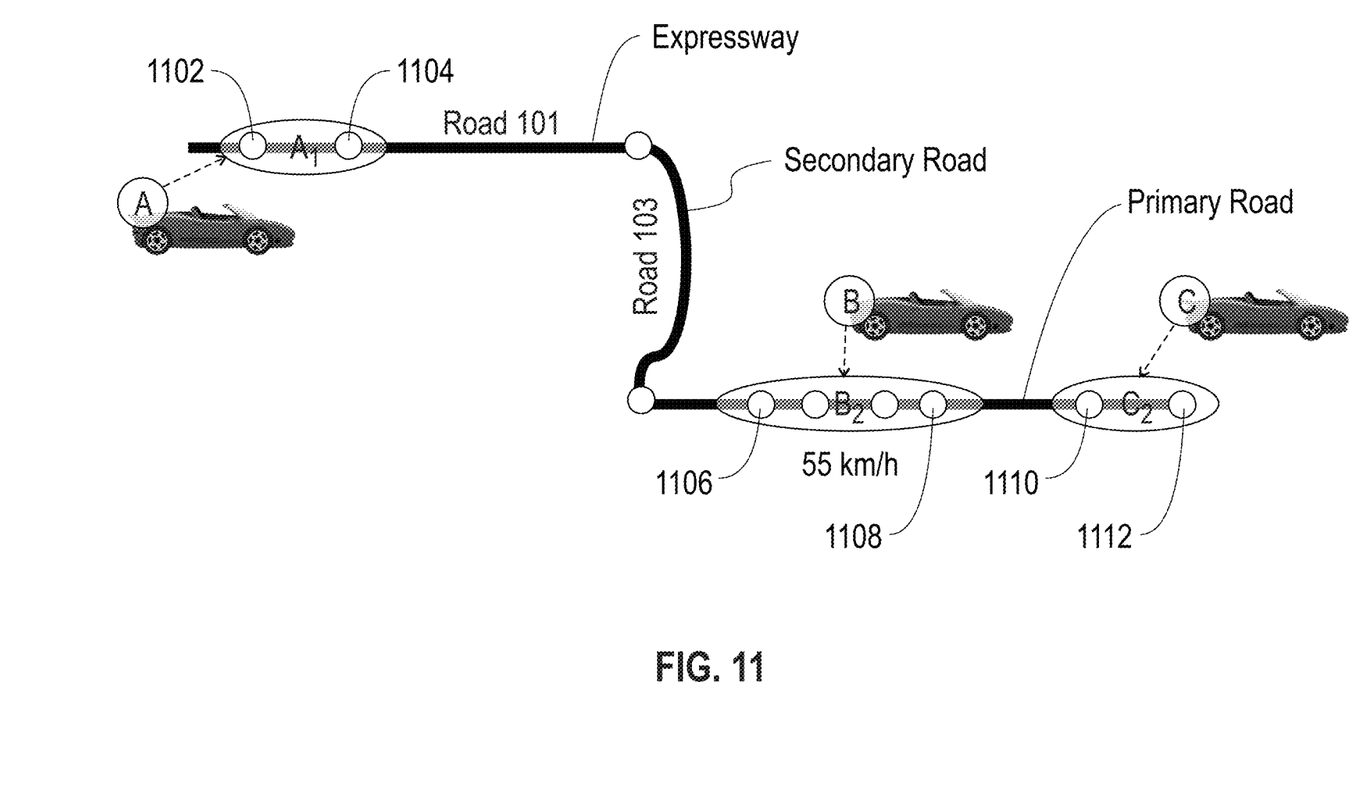
FIG. 11 shows the adjustment of the spacing of the GPS data points based on speed constraint by road hierarchy.

The location buffer builder 822 also includes an adjustment based on angular velocity constraints module 826 and an adjustment based on speed constraint by road hierarchy module 828. The adjustment based on angular velocity constraints module 826 receives its input from the initial boundary and distribution module 824. In FIG. 10 the spacing of the GPS data points 1002, 1004 . . . 1006, and 1008 is dependent on the angular velocity constraints. The output of the module 826 is provided as the input to the module 828. FIG. 11 shows the adjustment of the spacing of the GPS data points based on speed constraint by road hierarchy. The GPS data points 1102, 1104, 1106, 1108, 1110, and 1112 are spaced dependent on the speed constraints of the road hierarchy.

The location buffer builder 822 receives as an input the output of the sub-trajectories splitter 820 for each window. The output of the location buffer builder is provided as an input to location inference module 830. Another input to the location inference module 830 is the OBD speed and acceleration sequence of the vehicle provided from an on-board device 832. The output from the location inference module is the trajectory GPS data points with corrected location which is stored in the historical location inference results storage 810.

Figure 12:
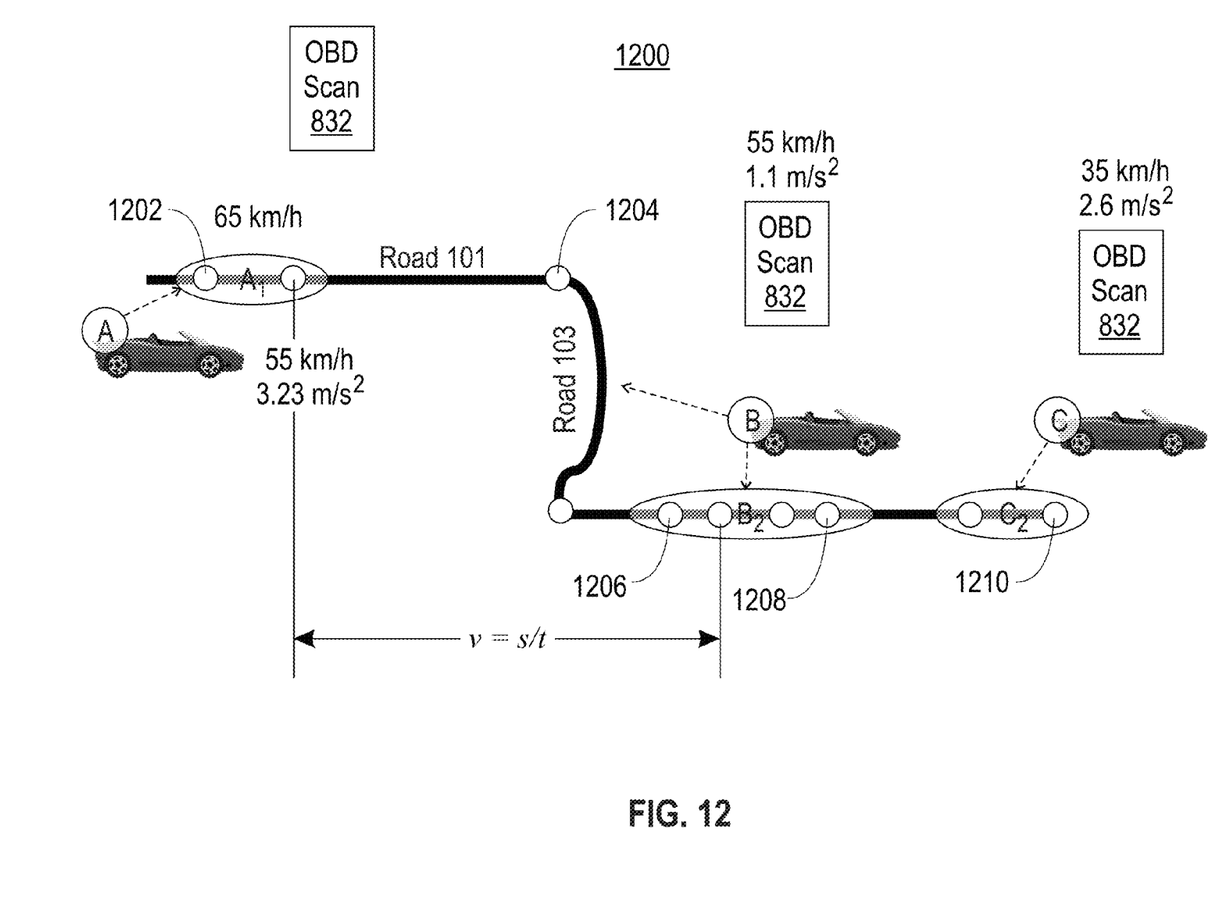
FIG. 12 shows the results of the location inference module of FIG. 7.

FIG. 12 shows adjustment of spacing of GPS data points 1202, 1204, 1206, 1208, and 1210 based on the speed and acceleration of the vehicle traveling along the roadway as measured by OBD Scan 832. This results from the location inference module 714. The location inference module contains 2 sub-modules: a speed sequence consistency evaluator and an optimization solver. The sequence consistency evaluator is responsible for evaluating the consistency for a speed sequence based on a given location sequence and speed sequence sampled from OBD 832. The optimization solver tries to find the optimal solution so that each location-candidate remains at as high possibility as possible and the inferred speed sequence is consistent with the sampled speed sequence as much as possible.

Also included in the system in FIG. 8 is a stored road network 834 which are basically maps and charts which are used to define the road network hierarchy.

The arrangement is FIG. 8 results in an accurate method and apparatus of road location inference for a moving object such as a vehicle traveling on a road in a road network.

Figure 13:
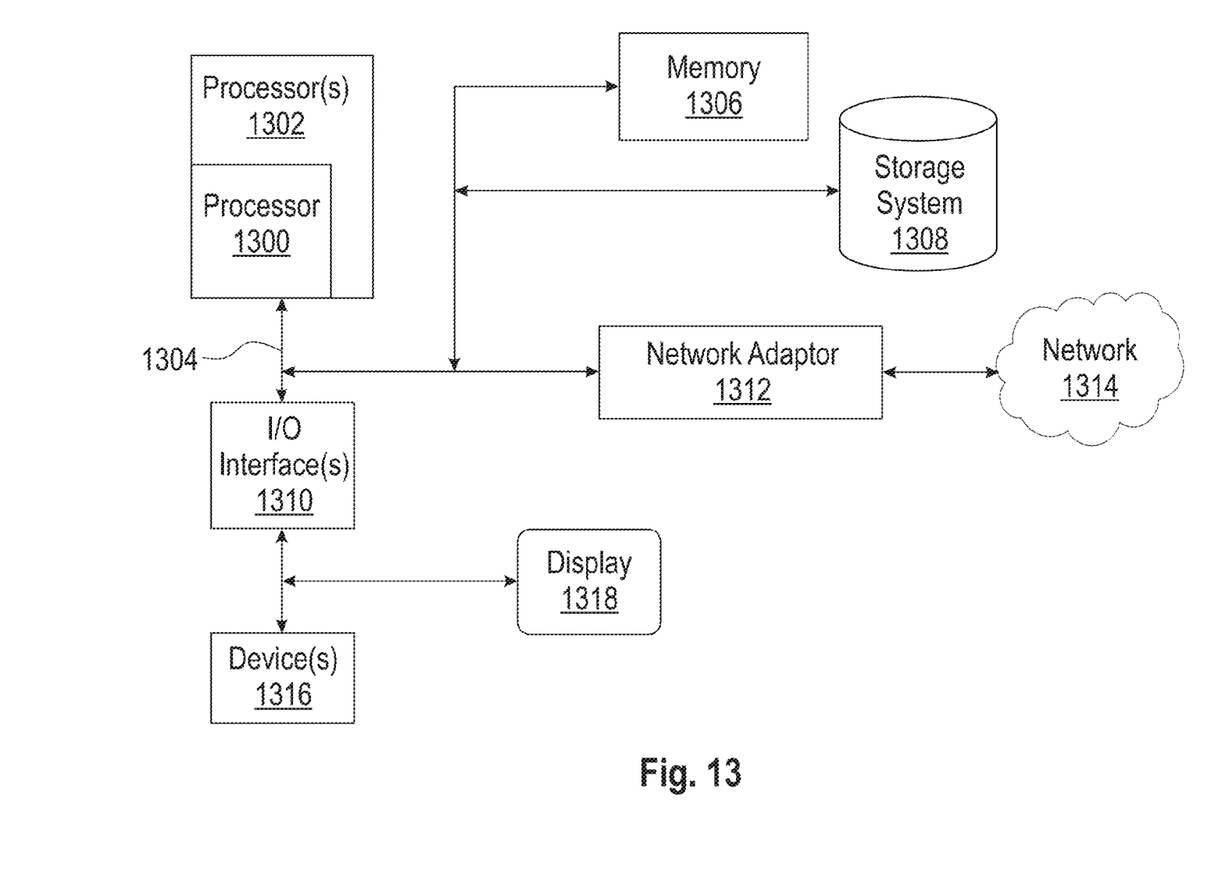
FIG. 13 is a schematic block diagram of a computer system for practicing various embodiments of the invention.

FIG. 13 illustrates a schematic diagram of an example computer or processing system that may implement the inferring the location of an object traveling along a path in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 13 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 1302, a system memory 1306, and a bus 1304 that couples various system components including system memory 1306 to processor 1302. The processor 1302 may include a module 1300 that performs the methods described herein. The module 1300 may be programmed into the integrated circuits of the processor 1302, or loaded from memory 1306, storage device 1308, or network 1314 or combinations thereof.

Bus 1304 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 1306 can include computer system readable media in the form of volatile memory, such as random access memory (RAM) and/or cache memory or others. Computer system may further include other removable/non-removable, volatile/non-volatile computer system storage media. By way of example only, storage system 1308 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1304 by one or more data media interfaces.

Computer system may also communicate with one or more external devices 1316 such as a keyboard, a pointing device, a display 1318, etc.; one or more devices that enable a user to interact with computer system; and/or any devices (e.g., network card, modem, etc.) that enable computer system to communicate with one or more other computing devices. Such communication can occur via Input/Output (I/O) interfaces 1310.

Still yet, computer system can communicate with one or more networks 1314 such as a local area network (LAN), a general wide area network (WAN), and/or a public network (e.g., the Internet) via network adapter 1312. As depicted, network adapter 1312 communicates with the other components of computer system via bus 1304. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus for inferring the location of an object traveling along a path comprising:
    map-matching module for linking Global Positioning System (GPS) data to paths and providing matched trajectory GPS data;
    location reliability assessment module for receiving linked GPS data to paths, reliability assessment rules, and context information and based on the reliability assessment rules and context information providing reliable GPS data points of the location of the object along the trajectory of the path;
    sub-trajectories splitter receiving the reliable GPS data points and splitting the trajectory of the reliable GPS data points into a plurality of shorter sub-trajectories paths having GPS data points;
    location buffer space builder receiving the reliable GPS data points and adjusting the initial boundaries of the sub-trajectories of the path and distribution of the reliable GPS data points based on angular velocity constraints and speed constraints of the path hierarchy, and
    location inference module for combining the GPS data points of shorter sub-trajectories and location buffer space data points and providing an accurate inferred path location of the object.

2. The apparatus as set forth in claim 1, wherein the path is a roadway in a road network and the object is a vehicle.

3. The apparatus as set forth in claim 1, wherein the reliability assessment rules comprise whether the object is traveling at a high speed or a low speed.

4. The apparatus as set forth in claim 1, wherein the context information comprises historical location inference results and neighborhood query information.

5. The apparatus as set forth in claim 1, further comprising an OBD Scan and a location inference module, wherein the OBD Scan provides speed and acceleration of the object to the location inference module and the location buffer builder output being provided to the location inference module where the location inference module provides trajectory GPS data points with correct location to an historical location inference results storage.

6. A method of inferring the location of an object traveling along a path comprising:
    obtaining Global Positioning System (GPS) data of the location of the object;
    map-matching the GPS data to known path locations for providing matched trajectory GPS data;
    receiving linked matched trajectory GPS data, reliability assessment rules and context information and based on the reliability assessment rules and context information providing reliable GPS data points of the location of the object along the trajectory of the path;
    splitting the object trajectory of the path into a plurality of shorter sub-trajectories along the path having GPS data points;
    receiving the reliable GPS data points and adjusting the initial boundaries of the sub-trajectories of the path and buffer space distribution of the reliable GPS data points based on angular velocity constraints and speed constraints of the path hierarchy, and
    combining the split trajectories path GPS data points buffer space distribution of the reliable GPS data points to provide an accurate inferred path location of the object.

7. The method as set forth in claim 6, wherein the path is a roadway in a road network and the object is a vehicle.

8. The method as set forth in claim 6, wherein the reliability assessment rules comprise whether the object is traveling at a high speed or a low speed.

9. The method as set forth in claim 6, wherein the context information comprises historical location inference results and neighborhood query information.

10. The method as set forth in claim 6, further comprising providing speed and acceleration of the object to the location inference module and the adjusted initial boundaries and distribution of the GPS data points and providing trajectory GPS data points with correct location to an historical location inference results storage.

11. A non-transitory computer readable medium having computer readable program for inferring the location of an object traveling along a path, comprising:
    obtaining Global Positioning System (GPS) data of the location of the object;
    map-matching the GPS data to known path locations for providing matched trajectory GPS data;
    receiving linked matched trajectory GPS data, reliability assessment rules and context information and based on the reliability assessment rules and context information providing reliable GPS data points of the location of the object along the trajectory of the path;

splitting the object trajectory of the path into a plurality of shorter sub-trajectories along the path having GPS data points;

receiving the reliable GPS data points and adjusting the initial boundaries of the sub-trajectories of the path and buffer space distribution of the reliable GPS data points based on angular velocity constraints and speed constraints of the path hierarchy, and combining the split trajectories path GPS data points buffer space distribution of the reliable GPS data points to provide an accurate inferred path location of the object.

12. The non-transitory computer readable medium as set forth in claim 11, wherein the path is a roadway in a road network and the object is a vehicle.

13. The non-transitory computer readable medium as set forth in claim 11, wherein the reliability assessment rules comprise whether the object is traveling at a high speed or a low speed.

14. The non-transitory computer readable medium as set forth in claim 11, wherein the context information comprises historical location inference results and neighborhood query information.

15. The non-transitory computer readable medium as set forth in claim 11, further comprising providing speed and acceleration of the object to the location inference module and the adjusted initial boundaries and distribution of the GPS data points and providing trajectory GPS data points with correct location to an historical location inference results storage.

* * * * *